April 15, 1952 R. R. RICHARDSON ET AL 2,593,344
DOCTOR BLADE MECHANISM
Original Filed Aug. 20, 1945 7 Sheets-Sheet 1

Fig. 1

Inventors:
Ralph R. Richardson
William H. Edmondson
By: Soans, Pond & Anderson
Attys.

Fig. 4

Patented Apr. 15, 1952

2,593,344

UNITED STATES PATENT OFFICE 2,593,344

DOCTOR BLADE MECHANISM

Ralph R. Richardson and William H. Edmondson, Chicago, Ill., assignors to United Biscuit Company, a corporation of Delaware Original application August 20, 1945, Serial No. 611,533. Divided and this application March 5, 1947, Serial No. 732,558

2 Claims. (Cl. 101—157)

This application is a division of our copending application, Serial No. 611,533, which relates to printing presses.

This application relates to the construction of a doctor blade mechanism which regulates the amount of ink carried by the printing cylinder to the work, and the main objects of the invention are to provide doctor blade mechanism which permits a wide range of adjustment of the doctor blade to facilitate setting of the blade in advantageous operating positions relative to various sizes of printing rolls which may be employed in the press, and to provide an adjustable doctor blade structure which will afford a wide range of operating positions to suit various operating conditions whether or not various printing roll sizes are involved. It is also an object of this invention to provide adjustable doctor blade mechanism which may be quickly and easily adjusted together with adjusting mechanism which will provide micrometric adjustment within a wide range of adjustment.

Other objects and advantages of the invention will be understood by reference to the following specification and accompanying drawings (ten sheets) wherein there is illustrated an improved intaglio printing press embodying a selected form of the invention.

In the drawings:

Fig. 6 is a cross section on the line 6—6 of Figs. 4 and 5;

Fig. 7 is a fragmentary side elevation as indicated by the line 7—7 of Fig. 5;

The printing press illustrated in the drawings embodies a printing roll 1 and an impression cylinder 2, the paper or flat web 3 on which printing is to be effected being passed between said printing roll and impression cylinder in the direction indicated by the arrow 4. The impression roll 2 is preferably a rubber covered roll and it is vertically slidably mounted through the agency of bearing blocks 5 at its opposite ends in vertically extending guide members 6—6 which are supported by the stationary main frame 7. Downward movement of the impression roll 2 may be limited by engagement of the lower edges of its bearing blocks 5 with shoulders 8—8 formed on a frame member 9 and the impression cylinder is normally urged downwardly by means of an overlying roll 10. The roll 10 is vertically slidably mounted in the ways 6—6 through the agency of its end bearing members 11 and suitable spring means is provided for urging the bearing blocks 11 and the roll 10 downwardly to thereby urge the roll 2 downwardly.

The printing cylinder 1 is mounted for vertical adjustment toward and from the impression cylinder 2, and there are provided two means for effecting such movement of the printing cylinder. One means for moving the printing cylinder toward and from the impression cylinder surface to produce a predetermined limited amount of separation of the printing cylinder from the impression cylinder is to temporarily interrupt the printing operation of the press. The other means for adjusting the printing cylinder is designed to afford a greater range of adjustment and serves mainly to permit the mounting of printing cylinders of a substantial range of diameters in the press for cooperation with the same impression cylinder. The details of the printing roll mounting and the said adjusting means form part of the subject matter of our copending application, said Serial No. 611,533.

The printing cylinder 1 is preferably of the intaglio type and it is journalled in bearings such as indicated at 12 (Fig. 1) formed in a vertically movable and adjustable auxiliary frame member or cradle 13. Suitable bearing caps 14 are provided for cooperating with the bearings 12 to hold the end shafts 15 of the printing roll in place in the bearings 12.

The auxiliary frame member or cradle 13 comprises opposite side portions 16—16, which are rigidly interconnected by transversely extending frame elements such as indicated at 17. The side members 16—16 are provided with vertically extended bearing surfaces such as indicated at 18 cooperating with bearing surfaces 19 provided on the opposite side portions 20—20 of the main frame 7 (see Figs. 1, 3 and 4).

Figure 1:
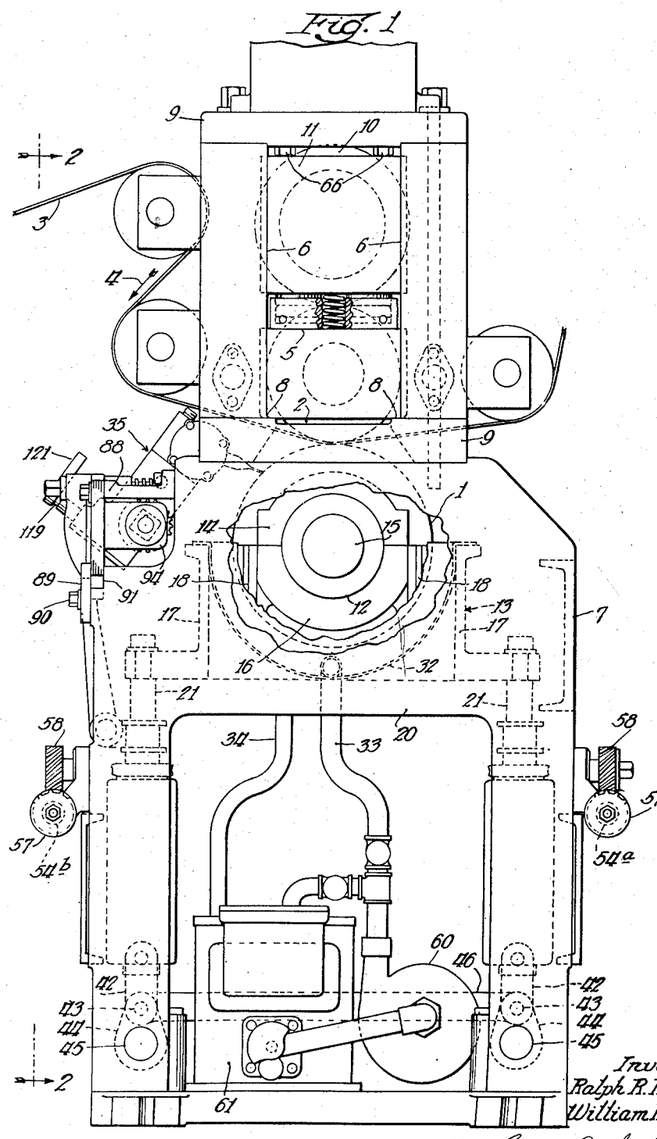
Fig. 1 is a side elevation, certain parts being broken away to more clearly illustrate other parts.

The auxiliary frame structure 13 is vertically adjustably supported in the main frame 7 by means of posts 21—21, there being two such posts at each side of the auxiliary frame. The posts 21 have the auxiliary frame 13 seated on their upper ends and secured thereto as indicated in Fig. 1 and each of said posts 21 extends downwardly into a sleeve 22 (see Fig. 6) which is vertically slidably but non-rotatably mounted within another sleeve 23. The outer sleeve 23 is in turn rotatably mounted in a suitably bored out bracket or casting 24 which is fixedly mounted on an adjacent portion of the main frame 7.

The outer sleeve 23 is held against vertical movement in the casting 24 by means of a pin 25 which is seated in the casting 24 and has its inner end projecting into a groove 26 provided in said outer sleeve. The upper end of the outer sleeve 23 is provided with a helical gear or worm wheel 27 through which the outer sleeve may be rotated by means of a cooperating helical gear or worm 28.

The inner sleeve 22 is keyed to the outer sleeve by means of keys indicated at 29—29 so that the inner sleeve is rotatable in unison with the outer sleeve but is also vertically slidable relative to the outer sleeve. Said inner sleeve is provided with internal screw threading indicated at 30 cooperating with screw threading 31 provided on the lower portion of the post 21 so that when the sleeves 23 and 22 are rotated, the post 21 will be adjusted up or down. By rotating the sleeves 23 and 22, the vertical position of the post 21 and of the auxiliary frame 13 may be adjusted. This adjustment is made sufficient to permit the use of printing rolls of whatever range of sizes is desired; for example, from 6-inch diameter rolls to 12-inch diameter rolls. The extent of adjustment required for that range of printing rolls is, of course, 3 inches plus whatever additional allowance may be desired.

The printing roll 1 may receive ink from any suitable means, such as an ink trough or pan shown at 32 which is removably mounted in the cradle 13. The trough 32 may be removed with the cradle after ink inlet and outlet conduits 33 and 34 respectively (Figs. 1 and 4) are disconnected from the trough or pan. A doctor mechanism shown at 35 is arranged as will hereinafter be explained so that it may easily and quickly be moved to an out-of-the-way position to permit the cradle 13 and printing roll 1 to be moved vertically into and out of place in the press.

For the purpose of adjusting the frame 13 up and down to accommodate different sized rolls, it is of course desirable that the four posts 21 be simultaneously adjusted. This is effected by simultaneously rotating the sleeves 22 around the respective posts. For that purpose there is provided a shaft 52 suitably journalled in bearings 36 carried by the main frame 7, the said shaft being equipped with worm-gears, such as the worm-gears 28 previously mentioned for meshing with the worm-wheels 27 of the respectively adjacent post structures. By turning the shaft 52, the two adjacent post structures will be simultaneously adjusted up or down in accordance with the direction in which the shaft 52 is rotated. To facilitate rotation of the shaft, one end thereof is provided with a squared projection 53 for receiving a suitable crank or hand wheel.

Extending parallel with the opposite ends of the apparatus there are provided shafts 54a and 54b, each of which are suitably journalled in the bearings 38 carried by the main frame 7. The shafts 54a and 54b are geared to the shaft 52 so as to be rotated when the shaft 52 is rotated, suitable helical gearing comprising gears 55 on the shaft 52 and gears 56 on the shafts 54a and 54b being provided.

At the other ends of the shafts 54a and 54b there are provided helical gears 57 which mesh with helical gears 58 provided on short shafts 59, which are suitably rotatably supported in bearings 39 carried by the main frame 7. Said shafts 59 carry worm-gears 28 in mesh with the worm-wheels 27 of the respectively adjacent post structures 21. Rotation of the shaft 52 is thus imparted to the shafts 54a and 54b and to the two short shafts 59 so that all four of the post units 21 will be simultaneously adjusted in the same direction. The various connecting gears are, of course, properly selected to effect rotation of all of the gears 27 simultaneously in the same direction.

For the purpose of facilitating temporary separation of the printing roll and the impression cylinder, provision is made in the improved structure for easily and quickly lowering and raising the printing roll to a limited extent, for example, about ½-inch (or whatever distance may be desired). In this instance, the raising and lowering of the printing roll is effected by raising and lowering the auxiliary frame 13 on which the printing roll is supported. This is done by moving the inner sleeve 22 (Fig. 6) and the post 21 at each corner, vertically. Such movement is accomplished through the agency of a sleeve extension member 40 which is vertically slidable in the casting 24 and interconnected with the sleeve 22 by means of a split collar 63 having internal flanges 64 and 65 which enter annular grooves 66 and 67 respectively in the inner sleeve 22 and the member 40. The parts of the split sleeve 63 are held in assembled relation and in operative relation to the inner sleeve 22 and the member 40 by means of a spring ring 41.

The lower end of the member 40 projects from the lower end of the casting 24 and has pivoted to it a link 42 which extends downwardly and has its lower end pivoted as shown at 43 (see Figs. 1 and 4) to an arm 44 carried by a shaft 45. There are two shafts such as the shaft 45, one at each end of the main frame, and there are of course two arms 44 on each of the shafts for cooperating respectively with the post elevating mechanisms at each corner. The shafts 45 are journalled in suitable bearings provided in the main frame 7. At one side of the apparatus the arms 44 are interconnected by a link 46 so that both shafts 45 will rock in unison (see Figs. 1, 2, and 4).

Figure 4:
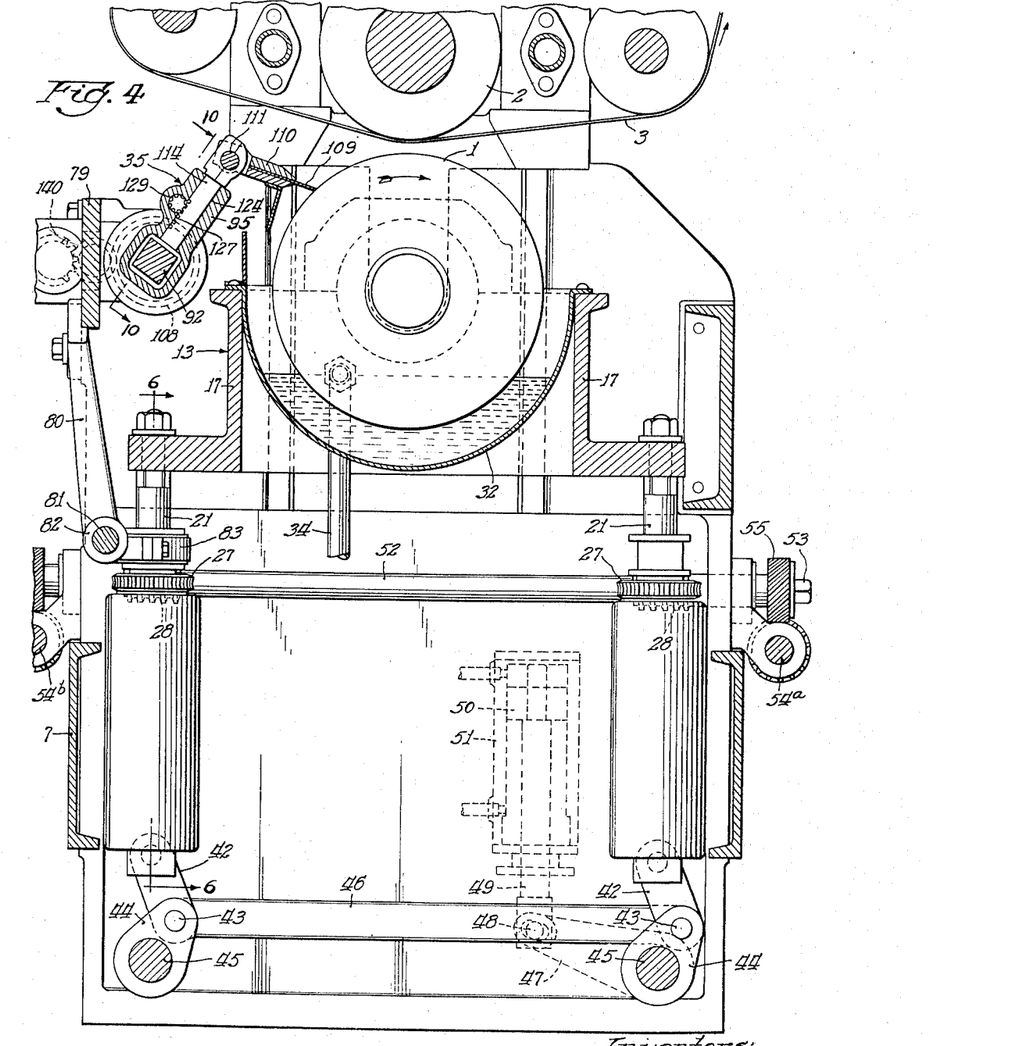
Fig. 4 is a section approximately on the lines 4—4 of Figs. 2 and 3.
Figure 5:
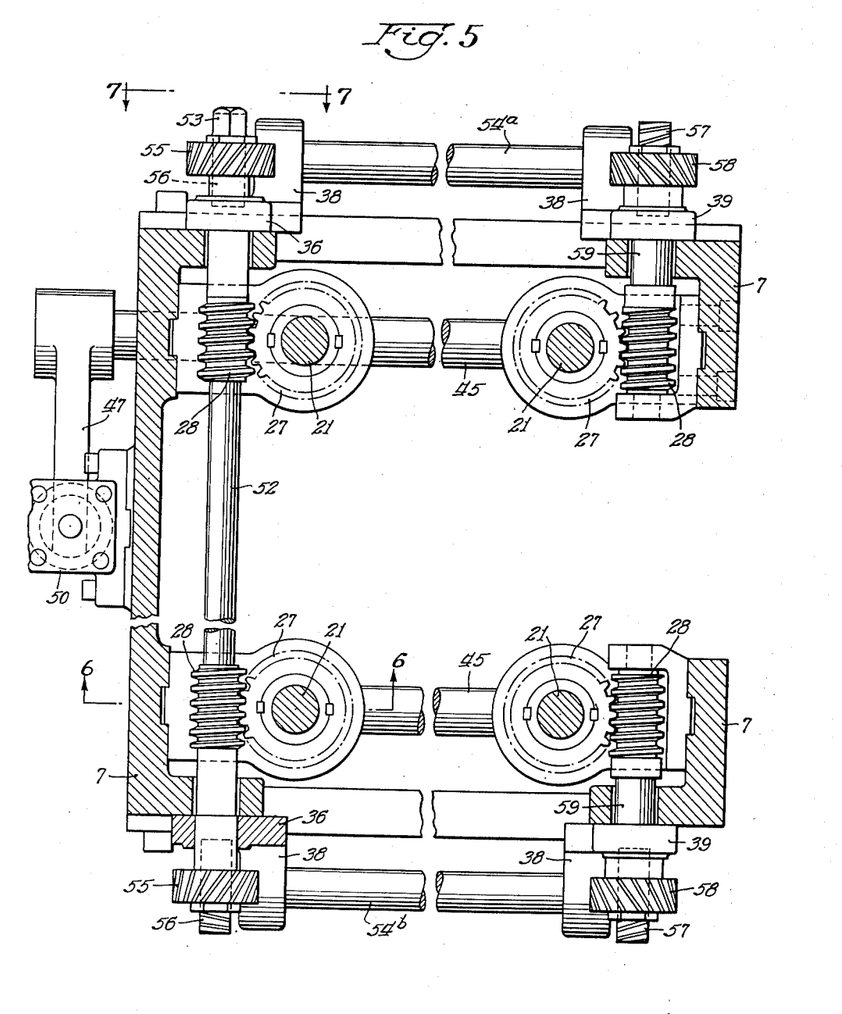
Fig. 5 is a plan section on the line 5—5 of Fig. 2.

One of the shafts 45 (see Figs. 2 and 4) is provided at one end with an arm 47 which extends at an angle to the adjacent arm 44 and has its free end connected by suitable pin and slot connection shown at 48 to the outer end of a piston rod 49. The piston rod 49 carries a piston head 50 within an hydraulic cylinder 51 into which fluid under pressure may be delivered for moving the piston 50 in the required direction for rocking the arm 47 and the shafts 45. As shown in Fig. 4, the printing roll 1 is in a lowered position and out of contact with the web 3. When pressure fluid is admitted to the upper end of the cylinder 51, it will of course force the piston 50 downwardly therein to thereby rock the shafts 45 counterclockwise (Fig. 4) so that the arms 44 and links 42 will be adjusted to a position of substantially vertical alignment as shown in Fig. 1, thereby moving the posts 21, the auxiliary frame 13 and the printing roll 1 upwardly into printing relationship to the sheet or web 3 and the impression cylinder 2. The delivery of pressure fluid to the cylinder 50 may be controlled by any suitable manual or automatic means, and it will of course be understood that appropriate piping is provided for delivering pressure fluid selectively to either end of the cylinder while releasing pressure fluid from the opposite end thereof.

Ink may be supplied to the ink trough or pan 32 in any suitable manner. In this instance, there is shown a motor-driven pump 60 (see Figs. 1 and 2) which draws ink from a suitable well or tank 61 and discharges it into the conduit 33 which discharges into the pan 32 (Fig. 1).

The ink is delivered to the lower portion of the pan 32 and the ink level may be determined by means of the position of the outlet opening through which the drain pipe 34 communicates with the ink pan.

By reference to Fig. 4 it will be seen that the ink supplied to the roll 1 is carried by the roll rearwardly and then upwardly to the printing line. Before the ink-coated surface of the roll reaches the printing line, surplus ink is removed by the doctoring mechanism 35 previously referred to. Said doctoring mechanism 35 is of the general type shown in Edmondson Patent 2,323,983 but modified and improved in some respects as will presently be described.

Surplus ink may flow downwardly on the surface of the roll 1 and into the pan 32 or any other suitable means may be provided for taking care of the ink which is doctored from the roll.

The doctoring mechanism 35 is carried by a plate 79 which is, in turn, supported by a pair of arms 80—80. The upper ends of the arms 80 are screwed or otherwise securely attached to the lower edge portions of the plate 79 and the lower ends of the arms are rotatably mounted on a shaft 81. The shaft 81 is supported by suitably bored out brackets 82—82 which have collar-like portions 83 secured to the upper ends of the inner sleeves 22 of the adjacent vertically adjustable post structures (see Figs. 4 and 6). The collar portions 83 may be of split form and suitably bolted together so as to permit assembly thereof around the upper end of said sleeve 22 between upper and lower flanges 84 and 85 respectively formed integrally with the sleeve 22.

It will be seen that when the sleeve 22 is moved up or down by means of the toggle like elements consisting of the links 42 and the rock arms 44, the arms 80, the plate 79, and the doctor blade mechanism will also be moved vertically in unison with the post structures and in unison with the printing roll. Hence, vertical adjustment of the printing roll by means of the hydraulically actuated toggle structure will occasion no change in the relationship of the doctor blade to the printing roll. It should be observed that the collar 83 is of such size that it fits snugly on the flanged upper end portion of the inner sleeve 22 so as to firmly support the arms 80 and the doctor blade structure while at the same time permitting the inner sleeve 22 to be rotated through the agency of the outer sleeve 23 for adjustment purposes already explained.

Figure 2:
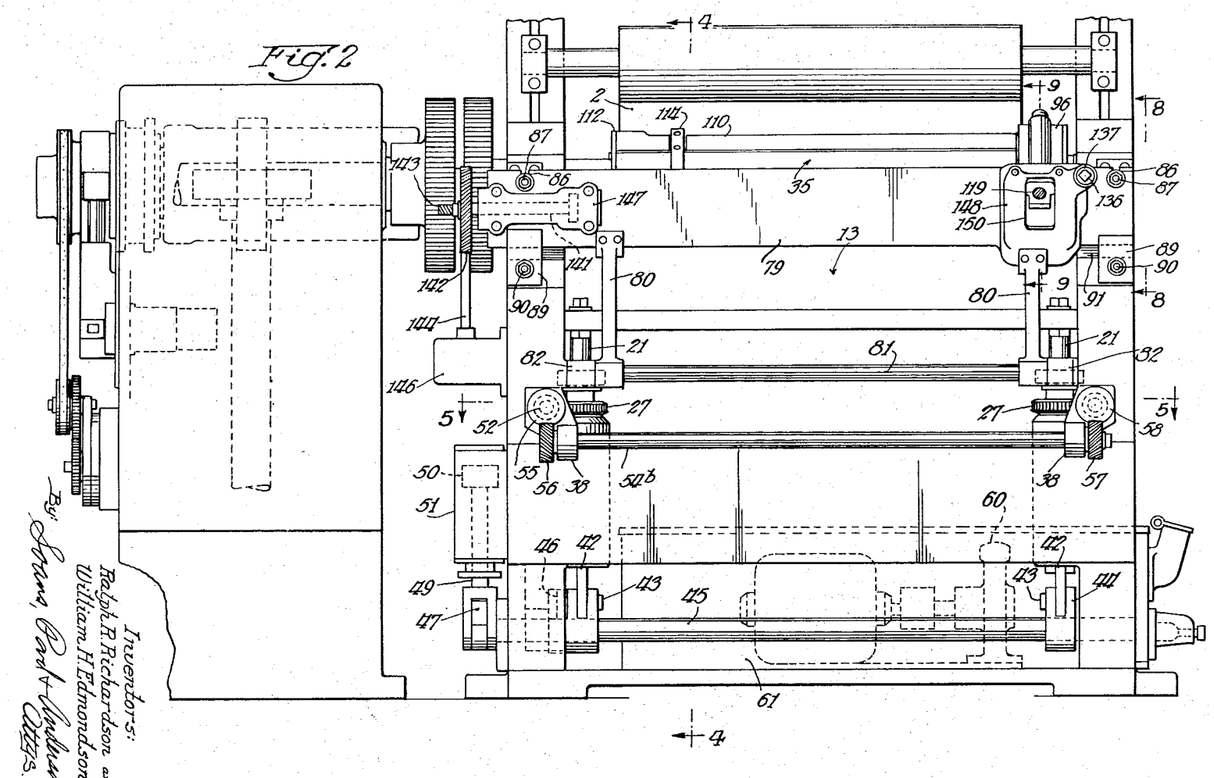
Fig. 2 is an end elevation looking at the left-hand end of the press as shown in Fig. 1.
Figure 3:
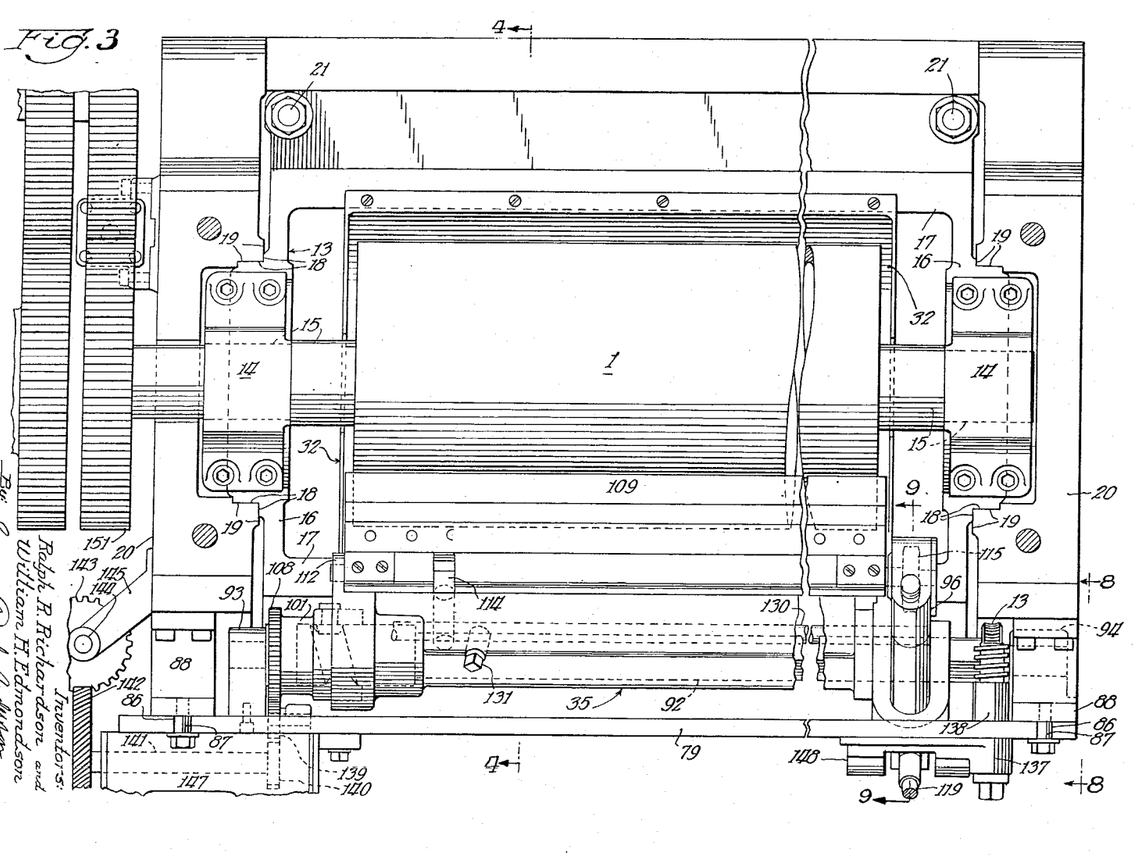
Fig. 3 is a plan showing the printing roll and doctor blade mechanism in the main body of the press from which there has been removed for purposes of illustration certain parts which normally overlie the printing roll.

For cooperating with the arms 80 to support the plate 79 and the doctor blade structure, opposite end portions of the plate 79 are vertically slidably mounted on the adjacent portion of the main frame structure 7. For that purpose each upper edge portion of the plate 79 near each end is provided with a slot 86 fitting slidably around and under a bolt 87, which is threaded into the adjacent main frame portion or into suitable brackets, such as indicated at 88, which are in turn secured to the main frame proper. The bolts 87 are preferably of a shoulder type as best shown in Fig. 3, which will provide the required space between the head of the bolt and the adjacent surface of the supporting bracket or frame part to permit sliding of the plate as already indicated. The lower marginal portion of the plate at each end is also slidably secured to the main frame or to the brackets 88, this being accomplished in this instance by means of clip plates 89, which are bolted as shown at 90 to the adjacent main frame portion (see Figs. 1, 2, and 8). The frame part 7 is suitably recessed as indicated at 91 to cooperate with the face of each clip 89 to vertically slidably receive the lower marginal end portions of the said plate 79.

Figures 10, 11:
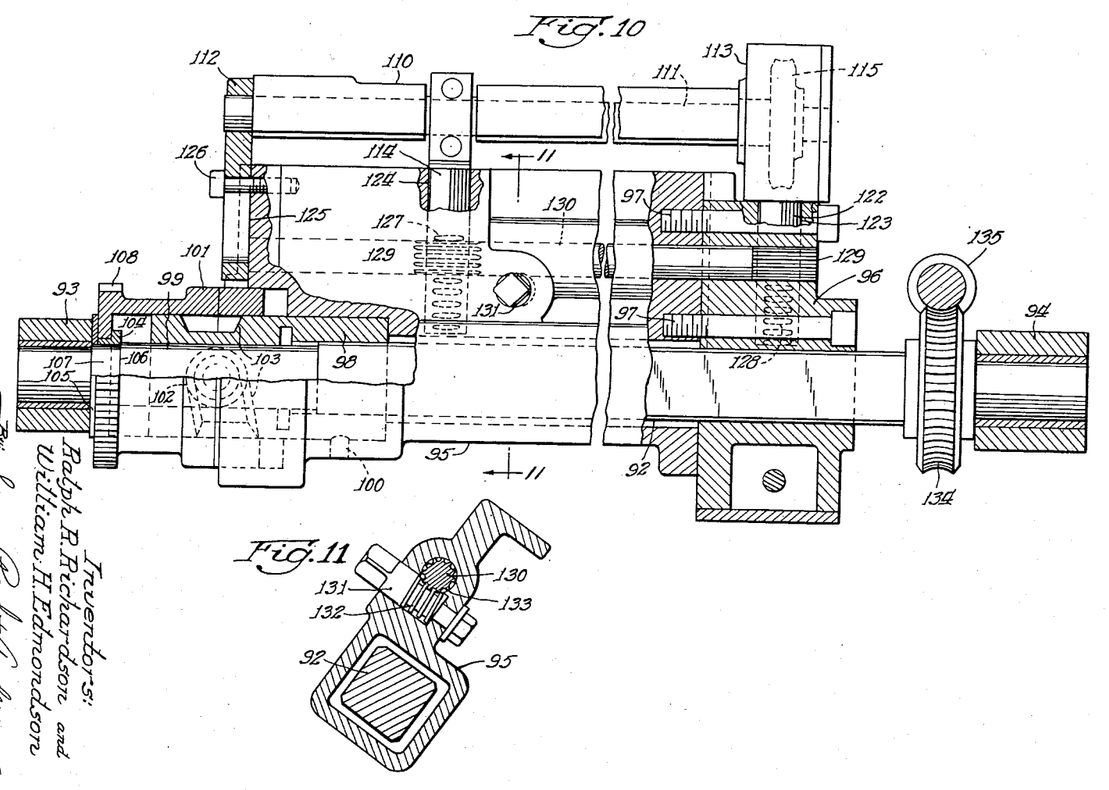
Fig. 10 is a section on the line 10—10 of Fig. 4.
Fig. 11 is a section on the line 11—11 of Fig. 10.

The doctor blade structure proper comprises a normally stationary shaft 92 which may be of square cross section for most of its length but which is provided with rounded end portions suitably journalled in bearings 93 and 94 which are carried by the plate 79 (see Figs. 3 and 10). A body casting 95 for the doctor blade is horizontally slidably mounted on the shaft 92, such mounting being effected at one end through the agency of an arm 96 which is bolted to the end of the casting 95, as indicated at 97—97. The arm 96 has a square opening broached out to properly fit on the square portion of the shaft 92. At the other end of the body casting 95 (Fig. 10) the casting is slidably mounted on the shaft through the agency of a sleeve 98, a portion of which has a square socket fitting over an end portion of the square shaft 92, and another portion suitably bored out to slidably and rotatably fit on a round or cylindrical portion 99 of said shaft 92. The sleeve 98 fits inside a suitably formed portion of the casting 95 and the sleeve is rigidly connected to the casting by suitable means, such as one or more set screws such as indicated at 100. Thus the sleeve 98 and casting 95 are movable horizontally as a single unit on the shaft 92.

To effect horizontal reciprocation of the body casting 95, there is provided a tubular member 101 which has a portion fitting telescopically over an outer end portion of the sleeve 98. The tubular member 101 is provided with a suitable roller 102 projecting inwardly from its inner surface and projecting into a cam groove 103 provided in the sleeve 98. The cam groove 103 is so formed that rotation of the tubular member 101 in a fixed plane will effect reciprocation of the sleeve 98 and body casting 95. Additional details of the cam groove and roller structure are shown in the aforementioned Edmondson Patent 2,323,983. The tubular member 101 is held against horizontal shifting movement by means of a suitably flanged bushing 104, which is in turn locked in place between the inner end of the bearing 93 or a washer 105 and a shoulder 106 formed on the shaft 92 by the provision of a suitably reduced diameter portion 107 of the shaft. The tubular member 101 is further provided with spur gear teeth 108 by which the member may be rotated.

The doctor blade 109 is clamped between the portions of a split head 110, the said head 110 being secured to a shaft 111. The shaft 111 is journalled at its ends in end members 112 and 113 (see Fig. 10) and near one end in a post member 114. The post 114 has a suitably formed head as best shown in Fig. 4 including a bolted-on cap portion for rotatably supporting the shaft 111.

Figures 8, 9:
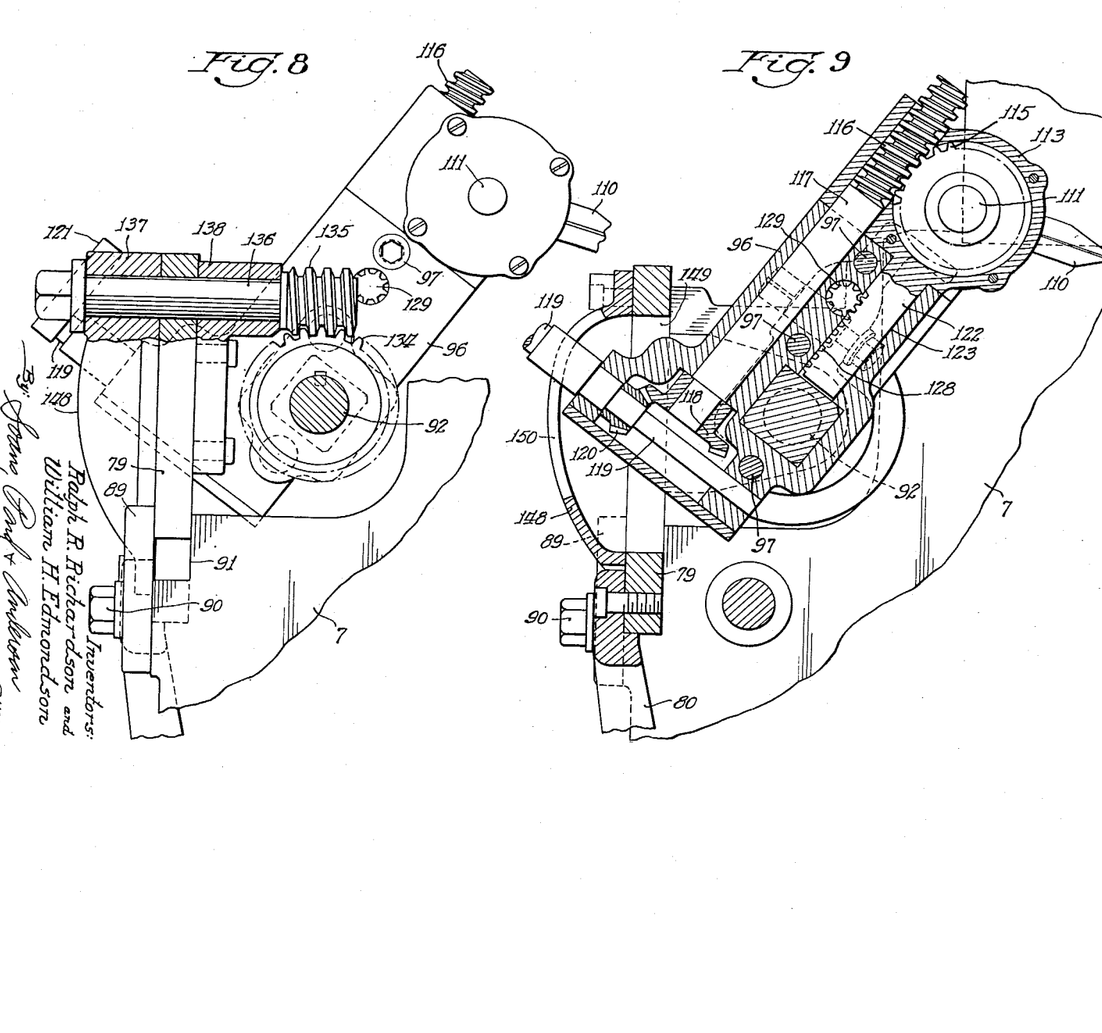
Figs. 8 and 9 are elevational and sectional views respectively on the lines 8—8 and 9—9 of Figs. 2 and 3, certain portions being broken away and shown in section in Fig. 8.

The shaft 111, together with the doctor blade 109 and its carrying head 110 may be rocked to adjust the angular relationship of the doctor blade to the printing roll. The means for effecting such rocking of the shaft 111 is best shown in Figs. 9 and 10. As there shown, the shaft 111 is provided with a worm wheel 115 which is keyed or otherwise secured to the shaft. Said worm wheel 115 meshes with a worm gear 116 provided on a shaft 117, which is rotatably mounted in the arm-like end member 96 and provided at its lower end with a bevel gear 118 which is keyed or otherwise secured to the shaft. The shaft 117 may be rotated by means of a manually rotatable shaft 119 suitably journalled in the lower end portion of the arm 96 and provided with a bevel gear 120 which meshes with the gear 118. The outer end of the shaft 119 may be provided with a hand lever or arm 121 to facilitate turning of said shaft 119.

The end member 113 in which the shaft 111 is journalled includes a shaft or post portion 122 which is slidable inwardly and outwardly in a socket 123 provided in said end arm 96. The post portion 122 of the end member 113 (see Figs. 9 and 10) corresponds to the post portion 114 of the intermediate bearing support for the shaft 111 which is also slidable inwardly and outwardly in a suitable socket 124 provided in said body casting 95 (see also Fig. 4). The end member 112 (Fig. 10) is similarly slidable in a guideway 125 provided in the end of the body casting 95 and it is adapted to be locked in selected position by means of a clamping screw 126. Each of the posts 114 and 122 are provided with gear teeth or racks 127 and 128 respectively which mesh with pinions, such as shown at 129 formed in a shaft 130, which is rotatably mounted in the body casting 95 and end arm 96. By rotating the shaft 130, the supporting members 114 and 122 for the shaft 111 may be moved inwardly and outwardly, provided of course that the clamping screw 126 is so adjusted as to permit the end member 112 to follow the movement of the shaft 111. For rotating the shaft 130 there is provided an adjusting member 131 (see Fig. 11) which is suitably rotatably mounted in the body casting 95, secured against endwise movement and provided with worm-gear teeth or equivalent screw threading, such as shown at 132 in mesh with suitable teeth 133 provided on a portion of the shaft 130. Because of the small pitch diameter of the gear 133 the adjusting member 131 is disposed at a slight angle, as is clearly shown in Fig. 3 to properly dispose its teeth 132 in operative relationship to the teeth 133 which are advantageously formed parallel with the axis of the shaft 130. The outer end of the adjusting member 131 is preferably squared as indicated to receive an adjusting wrench or lever to facilitate manual turning thereof.

When the shaft 111 is adjusted up or down relative to the upper edge of the body casting 96, the gear 115 on the shaft 111 will roll over the teeth of the worm gear 116 which is extended to maintain meshing relationship with the gear 115 as best shown in Fig. 14. Hence, if the shaft 111 is adjusted upwardly from the lowermost position shown in Fig. 9, the angle of the doctor blade 109 would be changed. The angle may be restored to the initial angle by turning the shaft 119 as already explained.

The doctor blade structure is also rockable about the axis of the shaft 92 to thereby adjust the doctor blade 109 toward and from the surface of the printing roll. Such adjustment is particularly desirable to facilitate the use of different sized printing rolls in the press.

For rocking the doctor blade structure about the axis of the shaft 92, said shaft is provided at one end with a worm-wheel 134 which is keyed or otherwise secured to the shaft. Said worm-wheel is in mesh with a worm-gear 135 carried by a shaft 136 which is suitably rotatably mounted in brackets 137 and 138 which are mounted on the plate 79. One end of the shaft 136 projects forwardly from the front bracket 137 and is suitably squared as shown in Fig. 13 to facilitate turning thereof by means of a wrench or the like. Turning of the shaft 136 and its worm-gear 135 will, of course, effect turning of the shaft 92 and the entire doctor blade structure. Rotation of the shaft 92 is imparted to the doctor blade structure by reason of the fact that the end arm 96 is mounted on a square portion of the shaft 92 as shown in Figs. 9 and 10.

The bearing 137 may be formed as a part of a housing 148 which is mounted on the plate 79 to cover a portion of the end arm 96 which projects outwardly through an opening 149 (Fig. 9) in the plate 79. Said housing 148 is suitably slotted as shown at 150 to permit the adjusting shaft 119 to project into readily accessible position.

The doctor blade structure may, in its entirety, be swung outwardly from the printing roll about the axis of the shaft 81 on which the structure is pivotally supported by means of the arms or brackets 80—80.

The means for driving the gear 108 and thereby effecting reciprocation of the doctor blade is such that said swinging movement of the doctor structure may be readily effected without first removing or disconnecting any of the driving connections. As shown in Figs. 2 and 3, the gear 108 is driven by means of a pinion 139 and a gear 140 which are suitably mounted for rotation on the plate 79 or in suitable bearing brackets secured thereto. The gear 140 is carried by a shaft 141 which is provided at its other end with a helical gear 142 which meshes with another helical gear 143. The gear 143 is carried by the upper end of a shaft 144 which is journalled in a bracket 145 carried by the side frame element 20. The lower end of said shaft 144 may be connected directly to an electric motor 146 mounted on the side frame of the machine. A suitable speed reducing gearing may be incorporated in the casing of the motor, if desired. The shaft 141 which carries the gears 140 and 142 is journalled in a suitable housing 147 which is secured to the plate 79.

When the doctor blade structure is to be swung outwardly on the shaft 81, the upper locking bolts 87—87 and the clips 89—89 are removed whereupon the doctor blade structure may be swung in its entirety to an inoperative, out-of-the-way position. Such outward swinging movement of the doctor blade structure effects disengagement of the gear 142 from the gear 143 and when the structure is returned to operative position the gears 142 and 143 may be readily brought into mesh without difficulty so that the driving connection between the motor 146 and the doctor blade structure is restored.

The doctor blade mechanism is so arranged that it follows the printing roll up and down into its inoperative and operative positions respectively, and said doctor blade mechanism is further readily movable in its entirety to an inoperative, out-of-the-way position facilitating removal of the printing cylinder and replacement thereof. The mounting of the doctor blade mechanism which permits the latter to be swung to an out-of-the-way position is such that its other adjustments are not necessarily changed so that it may be readily restored to its normal relationship to the printing roll without readjusting the setting of the various parts.

Various changes in the structure may be made while retaining the principles of the invention as referred to in the following claims.

We claim:

1. A doctor blade structure for a printing press comprising a shaft, a main body longitudinally slidably mounted on said shaft, a doctor blade holding head, a plurality of posts extending laterally from said head and slidably mounted in said main body to permit adjustment of the relationship of said head to said main body, said head including a shaft element pivotally mounted in said posts for rotatably supporting said head, a gear secured to said shaft element and disposed within one of said post members, a second shaft rotatably supported by said main body extending transversely of said shaft element and provided with gear teeth meshing with said gear, means for adjusting said second shaft to effect rotation of said gear and of said doctor blade shaft element, and means for effecting longitudinal movement of said posts to adjust the position of said head and its shaft element transversely of said main body, the arrangement being such that said gear is permitted to traverse said gear teeth on said second shaft during said adjustment of said posts, said second shaft remaining stationary.

2. A printing press having a printing roll and a doctor blade acting on said printing roll to regulate the depth of ink carried by said roll, a doctor blade carrying member, a doctor blade shaft rotatably mounting said doctor blade on a portion of said carrying member, a second shaft spaced from said doctor blade shaft and pivotally supporting said carrying member, said doctor blade being thereby mounted so as to be selectively adjustable about the axes of both of said shafts into selected doctoring relation to said printing roll, means mounting said doctor blade shaft on said carrying member for adjustment toward and from said second shaft, and means for effecting each of said adjustments independently of the other.

RALPH R. RICHARDSON.
WILLIAM H. EDMONDSON.

REFERENCES CITED

The following references are of record in the file of this patent:

UNITED STATES PATENTS

| Number | Name | Date |
|---|---|---|
| Re. 21,212 | Weiss | Sept. 19, 1939 |
| 1,370,071 | Tornberg | Mar. 1, 1921 |
| 1,981,912 | Fankboner | Nov. 27, 1934 |
| 2,115,376 | Weiss | Apr. 26, 1938 |
| 2,323,983 | Edmondson | July 13, 1943 |

FOREIGN PATENTS

| Number | Country | Date |
|---|---|---|
| 622,939 | Germany | Dec. 10, 1935 |